UNITED STATES PATENT OFFICE.

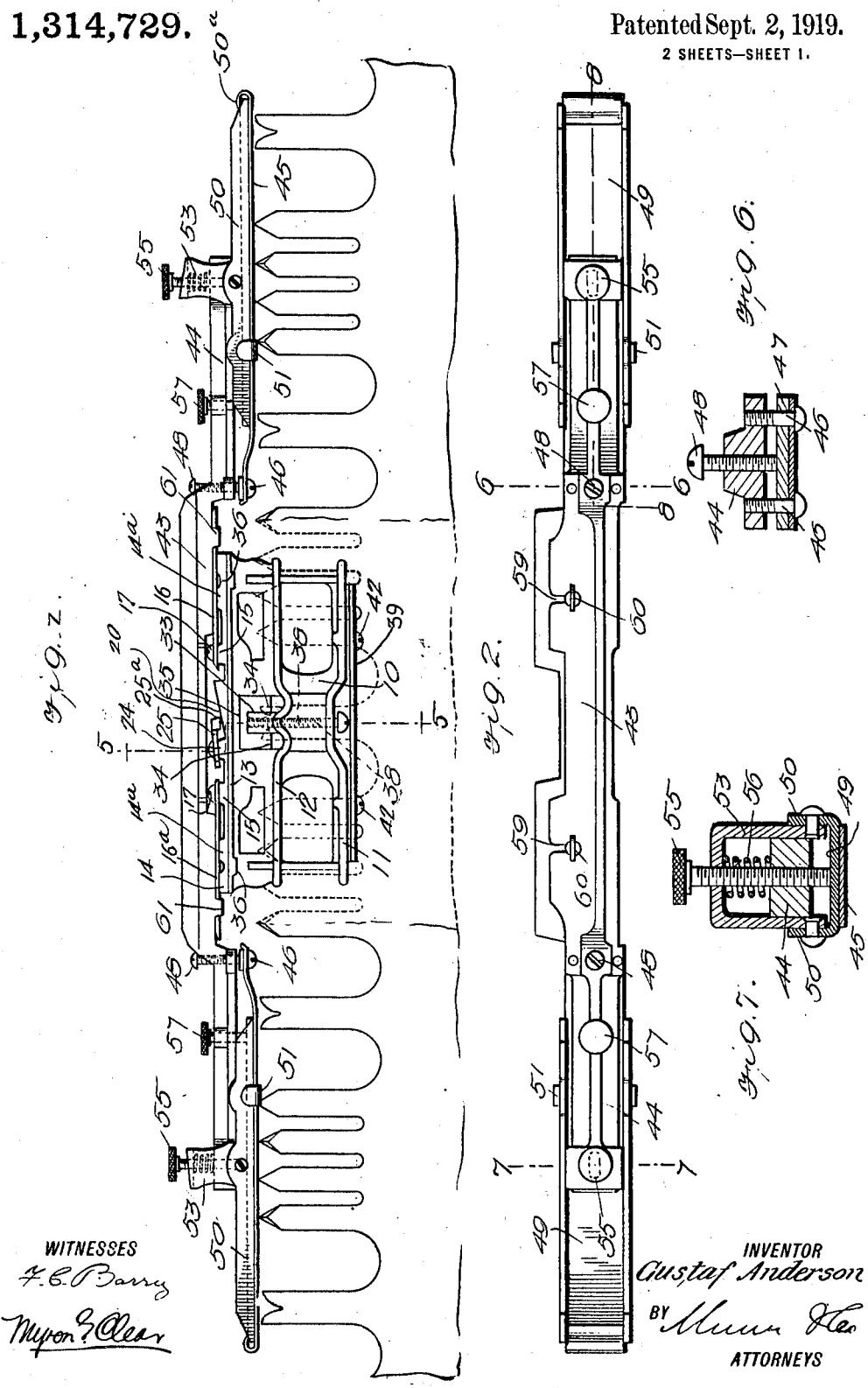

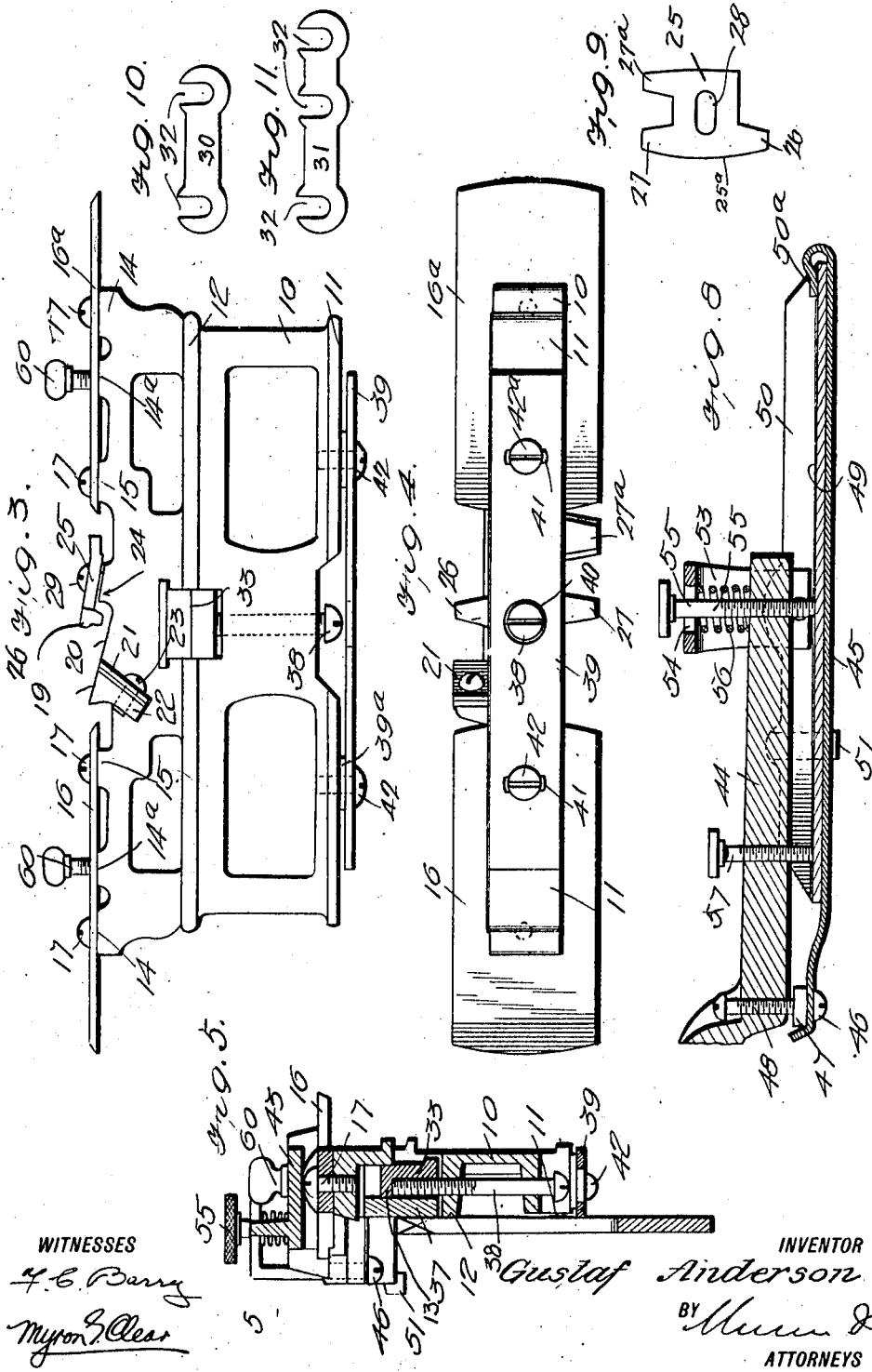

GUSTAF ANDERSON, OF SEATTLE, WASHINGTON.

SAW-FITTING TOOL.

1,314,729.

Specification of Letters Patent.

Patented Sept. 2, 1919.

Application filed May 14, 1918. Serial No. 234,392.

*To all whom it may concern:*

Be it known that I, GUSTAF ANDERSON, a citizen of the United States, and a resident of Seattle, in the county of King and State of Washington, have made certain new and useful Improvements in Saw-Fitting Tools, of which the following is a specification.

My present invention relates generally to saw fitting devices, and more particularly to certain improvements in connection with saw fitting devices of the nature described and claimed in my copending application 94,920, filed May 1, 1916.

Among the various objects of my present improvements I aim to provide raker teeth swage gages of such character and so located that the several gage points thereof may be simultaneously adjusted vertically with respect to pre-adjusted positions of the filing gages of the device, and without varying the elevation of the several gage points with respect to one another, in addition to means whereby the various pre-adjusted positions of both the swage gages and the filing gages may be simultaneously varied without disturbing the pre-adjusted relation of these two gages in respect to one another.

A further object of my present improvements is the provision of means by which the cap plates which serve to support the device on the cutting teeth of the saw in the swaging and filing operations may be adjusted to curvature so as to rest evenly on the points of the cutting teeth, and thus equalize any wear of said teeth.

Another object is the provision of improved means located at the lower portion of the device by which its vertical inclination may be varied so as to bring the angle of the side of the file, which in the filing operation is located in the upper part of the device, to correspond with the set of the saw teeth and for the further purpose of extending the side plane downward to provide for a greater bearing surface where the width of the blade of the saw being fitted will permit.

A still further object of the present improvements is to provide a saw jointer with provements is to provide a saw jointer with means adapted to glide on the cutting teeth of the saw for supporting a file at suitable elevations, whereby it may be made to contact with the side of the teeth points at their set or deflected portions only, either for evening the teeth or reducing the set without danger of the saw becoming timber bound, and a still further object is to provide such a jointer that is capable of maintaining an even curvature of the periphery of the saw without injury to such saw tooth sections, whose points may be too short to reach the line of such curvature.

In the accompanying drawings illustrating my present improvements and forming a part of this specification:

Figure 1 is a side elevation of the complete device, looking at the file holding side thereof, the file and a portion of a saw being shown, the latter partly in dotted lines and the former wholly in dotted lines.

Fig. 2 is a top plan view of the device shown in Fig. 1, removed from the saw;

Fig. 3 is a side elevation looking at the opposite side of the device with the jointer support removed;

Fig. 4 is a bottom plan view of the device shown in Fig. 3;

Fig. 5 is a vertical transverse section taken on line 5—5 of Fig. 1;

Fig. 6 is a vertical cross-section taken on line 6—6 of Fig. 2;

Fig. 7 is a similar view taken on line 7—7 of Fig. 2;

Fig. 8 is a longitudinal section taken on line 8—8 of Fig. 2;

Fig. 9 is a detailed plan view of the swage gaging member, removed; and,

Figs. 10 and 11 are detailed plan views of two forms of cap plate shims.

Referring now to these figures, and particularly to Figs. 1 and 3, the frame 10 of the present fitting device closely resembles that of my copending application above referred to, having flanges 11 and 12 on its opposite sides to form parallel side bearing planes for engagement with the sides of a saw in guiding the device along the saw. The frame also has an upper flange 13 at its jointer side, as seen in Fig 1, from which lugs 14 and 14ª in spaced relation adjacent the opposite ends of the device extend upwardly and coöperate with other spaced lugs 15 in forming elevated supports for cap plates 16 and 16ª, which latter are as usual, adjustable lengthwise, and are so spaced apart as to form a gap of considerable width between their inner ends. These cap plates are held by screws 17 which extend through slotted openings of the cap plates and into threaded openings of the outer and inner lugs 14 and 15, and having openings for the reception of thumb screws 60, which screw into threaded openings of the intermediate lugs 14ᵃ for a purpose which will be presently described.

In the gap between the inner ends of the cap plates 16 and 16ᵃ the frame 10 has at one side, as seen in Fig. 3, an integral raker tooth stop 19, whose surface is inclined to form a continuation of the inclined filing surface 20, and is extended above the normal lower plane of the several upper lugs 14, 14ᵃ, and 15, so as to permit the inner ends of the cap plates to be sufficiently elevated for the purposes of curvature. From the tooth stop 19 an integral rib 22 projects laterally for the support of one or more tooth stop plates 21, which plates are secured to the rib by a screw 23. The need of extension of the tooth stop 19 will be better understood by taking into consideration the fact that if the adjustment of the cap plates 16 and 16ᵃ with respect to curvature is more than would be required for producing the right length of raker teeth, where the least variation from the line of the points of the cutting teeth is required, two respective planes must be machined at elevations by which the tooth stop of the inclined plane will be left so much higher than the horizontal plane on the lugs as to make up for the difference.

The flange 13 has another lug 24 projecting upwardly in the gap between the inner ends of the cap plates and more particularly between the filing surface 20 and the inner end of the cap plate 16ᵃ, the top surface of which is machined at right angles to the side planes of the device, as are the other lugs, although at a longitudinally inclined angle, as clearly seen in Figs. 1 and 3, to provide a proper supporting surface for swage gage member 25, having at one side a single gage point 26 and at its opposite side gage points 27 and 27ᵃ, as seen particularly in Fig. 9. These gage points have horizontal gaging surfaces on their under sides, at different elevations, to correspond with the elevations produced by the adjustable tooth stop plates 21, and the body of member 25 has a slot 28 and is inclined with respect to its several gaging surfaces to correspond with the inclination of lug 24 on which the member is seated, adjustment being permitted by virtue of screw 29, which passes through the slot 28 and screws into the threaded opening of the lug 24.

The swage gaging member 25 just above described has a slightly curved case hardened edge 25ᵃ, adjacent to the filing surface and against which the edge of a file in use on said filing surface may contact, so as to thus provide for a smooth passage of the file without friction to minimize vibration and friction of the saw with respect to the saw tooth contacting faces of the cap plates when it is desired to true up the tips of the raker teeth particularly after the cutting teeth have been sharpened, it being borne in mind that when the raker teeth are being operated upon, the device rests upon adjacent series of cutting teeth which the cap plates 16 and 16ᵃ engage.

It will be noted that by loosening the screw 29 the swage gaging member 25 may be moved lengthwise of the frame 10 to simultaneously bring all of its gaging surfaces to a desired elevation and desired relation with respect to corresponding adjustments of the raker tooth filing gage, without varying the elevation of the gage points with respect to one another, and inaccurate machining of the lug 24 may be corrected by using thin washers to further elevate the swage gaging member, if desired.

It is also to be noted that by means of shim plates 30 and 31, respectively, shown in Figs. 10 and 11, which have transverse slots extending inwardly from one side to register with the threaded openings of the frame lugs 14, 14ᵃ and 15, the elevation of the swage gage and also the filing gage, may be simultaneously varied with respect to the plane of the saw tooth contacting surfaces of the cap plates for producing the desired length of raker teeth. The shim plates of Figs. 10 and 11 are different in length so that by using the shim plate 30 of Fig. 10 upon the lugs 14ᵃ and 15, only, and between these lugs and the inner portions of the cap plates, the latter may be sprung intermediate their ends and over the lugs 14ᵃ to correspond with the curvature of the saw tooth points, in order that these cap plates may bear evenly and uniformly upon spaced series of cutting teeth and equalize any wear which may result from such contact. When the shim plate 31 of Fig. 11 is used, the cap plates are elevated uniformly throughout their length.

The file clamping means of my present device are substantially the same as those of my application above referred to and include a vertically adjustable saw clamping slide 33 having shoulders 34 adapted to engage the lower edge of a file placed flatwise in the device, and having an upper surface 35 to engage the lower face of a file placed edgewise, the upper surface of the file in either position being engaged by file rests 36 depending from the flange 13 adjacent opposite ends of the frame 10. A file is shown in flatwise position at 37 in Fig. 5.

As in my application previously referred to, the file clamping slide 33 is grooved and loosely disposed on the upper end of a clamping screw 38 threaded vertically through the flanges 11 and 12, so that by rotating the same the file clamping slide may be raised and lowered. As seen in Fig. 5, the slide 33 is held upon the screw 38 by the flange 13, which forms a part of the frame side plane for the operation of swage gages on the file clamping side of the device and the central portion of which flange forms the chilled or otherwise hardened file guiding surface for the filing gage.

By referring to Figs. 1, 3 and 4, in particular, it will be noted that my present improvements provide a guide plate 39 for varying the vertical inclination of a clamped file to correspond with the set in the saw teeth, this guide plate having a central opening 40, through which the adjusting screw 38 may be reached, and being provided with transversely elongated slots 41 adjacent the opposite ends thereof. This plate is secured along the lower edge of the frame 10 by screws 42 and 42ª passing through slots 41 and into threaded openings of the lower flange 11, and when adjusted transversely to extend beyond the saw bearing plane of the frame, will of course contact with the side of the saw teeth and thus incline the frame slightly with respect to the saw, for the purpose above mentioned. This plate 39 may also be adjusted vertically for extending the side plane of the frame downwardly by interposing washers between the plate and the flange 11, when the blade of the saw being used is wide enough to permit this, as seen in Fig. 5, and in particular, where the washers appear at 39ª.

The relative elevation of the file in jointing and side dressing the cutting teeth of the saw is maintained by a jointer support in the form of a frame 43 of suitable form, having at its opposite ends longitudinally extending arms 44 projecting over and along the frame 10 in exact alinement with the plane occupied by the saw on which the frame is disposed. This frame 43 has transverse slots 59, as seen best in Fig. 2, which receive the thumb screws 60 before referred to, so that the frame or plate 43 may be rigidly secured against the upper surfaces of the cap plates 16 and 16ª, the lower surface of plate 43 being grooved or recessed to accommodate the heads of the screws 17.

On the underside of each of the extending arms 44 of the plate 43 are resilient saw teeth contact plates 45 adjustably secured to the arms by screws 46, located at the inner ends of the latter, as best seen in Fig. 6, which freely enter openings in said contact plates and a face block 47 and are screwed upwardly in threaded openings at the inner ends of the arms 44. Another screw 48 is inserted from the top of each arm 44 at its inner end, and is threaded therethrough and abuts at its lower free end the upper surface of the block 47 between the screws 46 for clamping the contact plates 45 against the heads of the screws 46. It is obvious that by manipulation of these screws 46 and 48 the inner ends of the contact plates 45 may be adjusted and held transversely level at any desired elevation within the range of the screws.

The contact plates 45 may be of any suitable thickness and length, and each have a reinforced section to carry the weight of the device, so that the plates 45 will not sag when passing over the raker teeth of the saw which are shorter than the cutting teeth. This reinforcement preferably consists of a sheet metal plate 49 having its side edges upturned to form parallel flanges 50 secured to the respective plate 45 by suitable means, as for instance bent lugs or lips 51, the outer ends of the plates 45 being turned upwardly and inwardly over the outer ends of the reinforcing plates 49, as seen particularly at 50ª in Fig. 8.

For holding the reinforced sections of the plates 45 transversely level, and also for holding them to the arms 44, I provide for each plate 45 an inverted U-shaped bracket 53 which straddles the respective arm 44 and has its lower ends securely fastened to the flanges 50 on the reinforcing plate 49, as shown in Fig. 7. Adjacent each bracket 53 the respective arm 44 has a vertical threaded opening through which an adjusting screw 55 passes downwardly, so that its lower end engages the upper surface of the reinforcing plate 49, each adjusting screw 55 extending downwardly through a slot 54 of the bracket 53 and through a coiled spring 56 compressed between the upper surface of the respective arm 44 and the upper portion of the bracket 53, so as to draw the plates 45 and 49 upwardly when the screw 55 is retracted. Thus the plates 45 will be yieldingly held against the lower ends of the adjusting screws 55 which are disposed about midway of the ends of the said plates and may be termed pivotal points.

Each arm 44 is also provided with another screw 57 threaded downwardly therethrough to bear against the inner end of the respective reinforcing plate 49, as clearly seen in Fig. 8, so as to prevent the outer ends of the plates 45 from flopping on a low saw toothed section when the pivotal point at the respective screw 55 passes over a section of teeth which may be too high or too long, injury to the shorter teeth being thereby prevented. As the inner ends of the plates 45 are secured to the arms 44 by the screws 46, before mentioned, they would glide smoothly and resiliently over the saw teeth even without the screw 57, but by virtue of this screw the tooth points can be jointed and their set made even, and the adjustment of the inner ends of the plates 45 may therefore remain comparatively permanent for both the edgewise and flatwise position of the file, as will be understood by a comparison of Figs. 1 and 8. The frame plate 43 which is secured as above described, by means of the thumb screws 60, cap plates 16 and 16ª, is also provided adjacent its opposite ends and adjacent the inner ends of the arms 44 with depending lugs and the like 61, which engage the cap plates at one side edge in order to hold the arms 44 which carry the contact plates 45 in longitudinal alinement with the plane of the saw operated upon. In operation, each of the contact plates 45 should have its inner end adjusted to the approximate plane of what would be the lower edge of the file when placed edgewise in the tool, and from that position the reinforced portions of said plates 45 may be adjusted to the different positions either for jointing or for side dressing the saw teeth by means of the screws 55 and 57 with the object in mind of carrying the file on lines corresponding with the line of the general curvature of the saw. In this way the file in the jointing operation will be active only on such tooth points as are too long and extend above the general plane of line of curvature.

After the cutting teeth have been jointed and set, the set of the teeth may be made even, or reduced if too much set has been given by placing the file flatwise in the tool and adjusting the reinforced portions of the contact plates 45 by the screws 55 and 57, so that only a limited portion of the file will come in contact with the side of the saw teeth as shown in Fig. 1, and therefore the saw will not be in danger as heretofore of becoming timber bound, which has been the chief objection to the practice of side filing the saw teeth.

By reason of the file being carried uniformly parallel with the line of curvature of the periphery of the saw an even set in the saw teeth will be assured. If the inclined angle of the file as held in the device is greater than the angle of the set in the saw teeth, this may be corrected by adjusting the plate 39 laterally so as to bear against the side of the saw teeth at the bottom of the device, to change the vertical inclination of the frame 10.

By reference to the raker teeth swaging and file gages, the swage gage member 25 should be adjusted to bring the gaging surface of gage point 26 in desired relation to the integral tooth stop of the filing gage, with respect to elevation. Gage points 27 and 27ª being on the opposite side of the device and having their gaging surfaces a few thousandths of an inch lower than that of the point 26, will have the same relation to the adjustments produced by the stop plates 21 as the point 26, has to the integral stop tooth 19. By loosening the screw 29 to permit member 25 to be moved slightly lengthwise of the frame 10, the simultaneous adjustment of all of the gage points can be accurately and speedily accomplished.

After the swage and filing gages have been thus adjusted with respect to one another, the short shim plates 30 of Fig. 10 are interposed between the cap plates and the lugs 14ª and 15 for simultaneously adjusting the several gages with respect to the length of raker teeth desired, and for producing a curvature in the cap plates. If it is necessary to further elevate the cap plates, the shim plates 31 of Fig. 11 for instance may also be used.

Upon inspection of Figs. 1 and 8, it will be seen that the connecting means of the contact plates 45 with the reinforcing plates 49, is located at some distance from the inner ends of the latter, whereby the flexible length of the contact plates is increased, and will conform, more or less, to the curvature of the saw when in the position shown in Fig. 8, by retracting the adjusting screw 57, as may be readily understood.

By the above arrangement the various gages when once adjusted will seldom require adjustment other than merely shifting the position of the tooth stop plates 21.

It is also to be understood from the foregoing description that by the use of the particular jointer support I have described, I may be enabled to eliminate all danger of racking and flopping of the ends of the runners or contact plates 45, and thereby obviate injury to saw teeth which may already be too short.

I claim:

1. In a saw fitting device of the character described a frame having at the upper portion of its body series of upwardly projecting lugs adjacent its opposite ends, each series, including outer, inner, and intermediate lugs, cap plates supported by the said lugs, gages carried by the body of the device between the cap plates, and shim plates for disposition between the said lugs and cap plates, certain of which extend from the inner lugs to the intermediate lugs only whereby the cap plates may be flexed at points intermediate their ends to accord with the curvature of a saw tooth edge.

2. In a saw fitting device a frame a filing gage on the frame including an integral inclined filing surface and adjustable tooth stops, and a swage gage member adjacent to the filing gage, having a series of gaging points of different elevations corresponding to the elevations of the tooth stops.

3. In a saw fitting device a frame a filing gage on the frame including an integral tooth stop and adjustable tooth stop plates, and a swage gaging member adjacent to the filing gage, having a series of gaging points of different elevations corresponding to the integral tooth stop and the adjustable stop plates.

4. In a saw fitting device a frame, and a vertically adjustable swage gaging member thereon provided with a plurality of independent gaging points at different elevations with respect to the frame, for the purpose described.

5. In a saw fitting device a frame a vertically adjustable swage gaging member of integral structure carried by the frame and provided with a plurality of laterally projecting gage points at different elevations with respect to the frame, for the purpose described.

6. In a saw fitting device a frame an inclined gage support, and a swage gaging member having a plurality of relatively immovable gage points and provided with a body portion inclined with respect to the gage points to accord with the inclination of said gage support, said gage body having a slotted opening, and a clamping screw extending through the slot of the gage member and threaded into the gage support for adjustably holding the former in position.

7. In a saw fitting device a main frame file clamping means for jointing and side dressing saw teeth, an upper frame attached to the main frame, and provided with longitudinally extending arms, and saw tooth contact plates carried by and adjustable vertically with respect to the arms of said frame for the purpose described.

8. In a saw fitting device a main frame file clamping means on the frame for use in jointing and side dressing saw teeth, a jointing frame secured to the upper portion of the main frame and having arms extending from the end thereof beyond the ends of said main frame parallel to the longitudinal plane thereof, and adjustable tooth contact plates carried by the said arms for the purpose described.

9. In a saw fitting device a main frame a detachable jointing frame carried by the main frame and having longitudinally extending arms projecting beyond the ends of said main frame, flexible contact plates for engagement with the teeth of a saw, and adjustable supporting connections between the said contact plates and the said jointing frame and arms for adjusting and flexing the plates as described.

10. In a saw fitting device a main frame an upper detachable jointing frame, connected thereto and provided with longitudinally extending arms, flexible tooth contact plates adjustably connected at their inner ends to the inner ends of said arms, and reinforcing plates extending along the tooth contact plates and adjustably connected to the outer portions of the arms for the purpose described.

11. In a saw fitting device a main frame an upper detachable jointing frame carried by the main frame and provided with longitudinally extending arms projecting from the ends thereof, flexible tooth contact plates adjustably connected at their inner ends to the said arms adjacent the inner ends of the latter, reinforcing plates extending along and having connection with the said contact plates, adjustable connections between the outer portions of the arms and the said reinforcing plates and engaging the latter intermediate their ends, and other adjusting members between the said arms and the reinforcing plates engaging the inner ends of the latter.

12. In a saw fitting device a frame means thereon forming a saw bearing surface at one side, file clamping means, and means adjustable with respect to the frame and engageable with the side of the saw teeth to vary the vertical inclination of the frame with respect to the side of the saw.

13. In a saw fitting device a frame, and a lower longitudinally extending and laterally adjustable guide plate on the frame for varying the inclination of said frame when in position against one side of a saw.

14. In a saw fitting device a frame, and a lower longitudinally extending and laterally adjustable guide plate on the frame for varying the inclination of said frame when in position against one side of a saw, said plate also being shiftable vertically with respect to the frame for the purpose described.

GUSTAF ANDERSON.

Witnesses:
G. C. WINN,
LESTER O. GOVE.

Copies of this patent may be obtained for five cents each, by addressing the "Commissioner of Patents Washington, D. C."